(No Model.) 6 Sheets—Sheet 1.

Z. T. FRENCH & W. C. MEYER.
TRIMMING AND CHANNELING MACHINE.

No. 599,602. Patented Feb. 22, 1898.

WITNESSES
INVENTORS (No Model.)  6 Sheets—Sheet 3.

Z. T. FRENCH & W. C. MEYER.
TRIMMING AND CHANNELING MACHINE.

No. 599,602. Patented Feb. 22, 1898.

Fig. 3.

WITNESSES
INVENTORS (No Model.) 6 Sheets—Sheet 6.

Z. T. FRENCH & W. C. MEYER.
TRIMMING AND CHANNELING MACHINE.

No. 599,602. Patented Feb. 22, 1898.

WITNESSES
F. H. Davis.
Harry P. Robinson.

INVENTORS
Zachary T. French
William C. Meyer
by B. J. Noyes, atty.

UNITED STATES PATENT OFFICE.

ZACHARY T. FRENCH AND WILLIAM C. MEYER, OF BOSTON, MASSACHUSETTS.

TRIMMING AND CHANNELING MACHINE.

SPECIFICATION forming part of Letters Patent No. 599,602, dated February 22, 1898.

Application filed May 11, 1896. Renewed May 29, 1897. Serial No. 638,802. (No model.)

*To all whom it may concern:*

Be it known that we, ZACHARY T. FRENCH and WILLIAM C. MEYER, of Boston, county of Suffolk, and State of Massachusetts, have invented an Improvement in Trimming and Channeling Machines, of which the following description, in connection with the accompanying drawings, is a specification, like letters and figures on the drawings representing like parts.

In applications for Letters Patent, Serial No. 530,849, filed December 5, 1894, and Serial No. 538,614, filed February 16, 1895, machines were shown for operating upon the soles of boots and shoes, the machine shown in the latter application being an improvement upon the machine shown in the former application, and one of the essential novel features embodied in said machine was the means employed for guiding the boot or shoe while the sole was being operated upon. The machine shown was especially designed for trimming and channeling the soles of lasted boots and shoes while secured to or upon the last, and the guiding device was such that the width of the projecting edge of the sole beyond the upper could be varied—as, for instance, it could be made wider all around the fore part than along the shank portion or it could be made widest along the outside ball portion and of less width around the toe and inside ball portion and of least width along the shank portions.

This invention is intended as an improvement upon the machine shown in said applications for Letters Patent; and it consists, essentially, in certain improvements in the means employed for guiding the boot or shoe while its sole is being operated upon—as, for instance, while being trimmed and channeled if trimming and channeling knives are provided.

In the machine shown in the aforesaid applications two independent guides were employed, one of which was used to the exclusion of the other to guide the lasted boot or shoe along the shank portions and the other was adapted to be brought into use to guide the lasted boot or shoe along or around the fore part, and while guiding the boot or shoe along such portion it acted to the exclusion of the shank-guide. The former guide, which acted as the shank-guide, was stationarily supported, and the latter guide, which acted as the fore-part guide, was made movable, and said movable guide when brought into engagement with the lasted boot or shoe was adapted to positively or bodily move the boot or shoe with relation to the trimming and channeling knives and away from the shank-guide, and when removed from engagement with the lasted boot or shoe permitted said boot or shoe to be positively or bodily moved toward and into engagement with said shank-guide. As the work is thus moved away from the shank-guide, the latter still bears upon the projecting welt or sole near its outer edge, and consequently a ridge or depressed line is formed, which is very objectionable.

This invention has for its object to overcome this difficulty, and in doing so the shank-guide heretofore made stationary is made movable, so as to follow more closely in the crease all around the shoe or that portion thereof which is being trimmed and channeled, and being thus made movable it may be employed as the means for positively or bodily moving the work with relation to the tools at any desired part of the operation. Therefore in accordance with our present invention two movable guides or supports are employed, one of which acts continuously along the shank portions and fore part and the other acts around the fore part only. These two guides will in some cases act conjunctively as guides around the fore part, and in other cases the last-guide will act to the exclusion of the shank-guide around said fore part, the shank-guide at such time not bottoming in the crease or entering it sufficiently to serve as a guide, yet at such time it is still a support for the work or welt and as such acts conjunctively with the last-guide. The continuously-acting guide or support may form a coöperative part of the clamp-feeding mechanism for the work, as in the applications above referred to, and being made movable, so as to continually enter the crease more or less, better enables it to perform such additional function.

The invention is herein embodied in a machine having trimming and channeling knives adapted to trim and channel the sole of the lasted boot or shoe as it is fed along and is adapted to be used for trimming both plain and extension edges.

Fig. 8, a diagram view of a Baltimore-edged sole, showing in dotted lines the outlines of the last.

The trimming-knife $e$ is attached in a removable manner to the lower end of an arm $e'$, projecting from a hub $e^2$, mounted upon a shaft $d^3$, said arm $e'$ being connected by a link $e^5$ with an eccentric-strap which embraces an eccentric-disk secured to the main shaft C, so that as said shaft rotates the knife $e$ will be oscillated in a direction toward and from the operator, acting upon the bottom of the projecting portion or edge of the sole of a lasted boot or shoe.

The guide or work-support $a$ is attached to the forward end of an arm $a^{20}$, pivoted at $a^{21}$ to an ear $a^{22}$ on the frame, said guide or work-support being represented as a loop and made more or less tapering at its lower end, thereby adapting it to enter the inseam or crease at the welt side of the sole. This guide or work-support $a$ is designed to continuously act all around the boot or shoe, or that portion thereof which is being operated upon, and in this respect differs from the work-support in the aforesaid application, wherein it was stationarily supported, and this movable guide or work-support herein forms an essential feature of novelty.

The pivoted arm $a^{20}$, carrying the guide or work-support $a$, is supported in elevated position by means of a strong spring $a^{25}$, and its upward movement is limited by a stop $a^{26}$, formed on the frame, against which the forward end of the arm strikes.

Intermittingly-operated clamp-feeding mechanism is provided for feeding the work along, consisting of the yielding vibrating sole-support $b^5$, adapted to bear upon or against the bottom of the sole, and a four-motion plate $d$, adapted to act against the opposite or welt side of the sole. The plate $d$ herein serves as a cutting-block against which the oscillating trimming-knife $e$ operates in addition to forming a coöperative part of the clamp-feeding mechanism. The sole-support $b^5$ carries the channel-knife $b$.

Figures 1, 2:
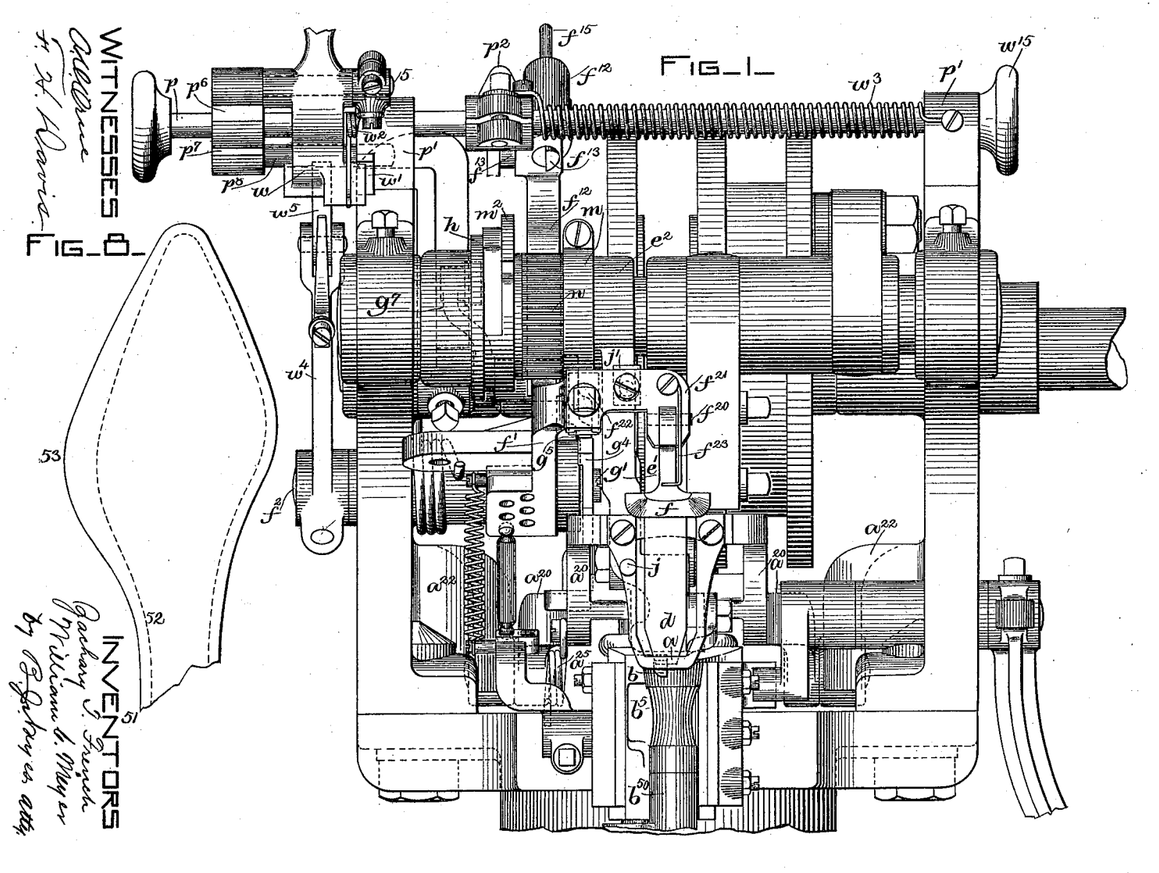
Figure 1 shows in front elevation a sole trimming and channeling machine embodying our invention.
Fig. 2 is a plan view of the machine shown in Fig. 1.
Figure 2:
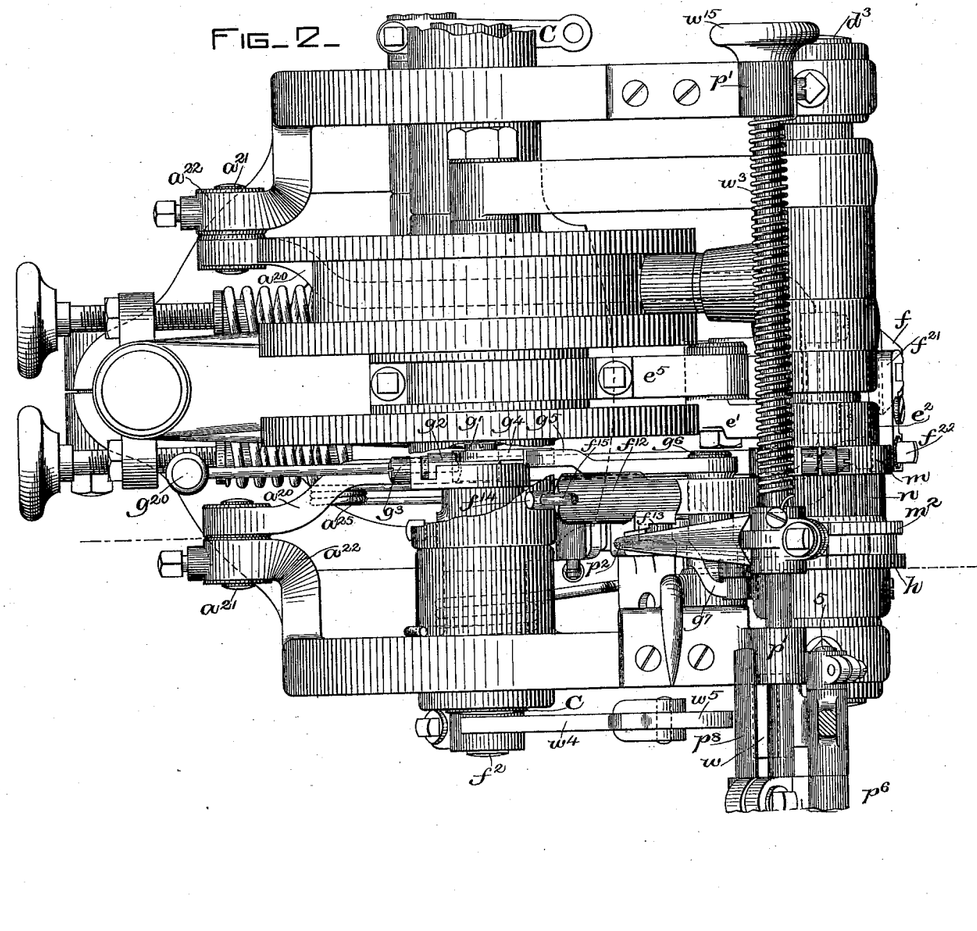
Figure 3:
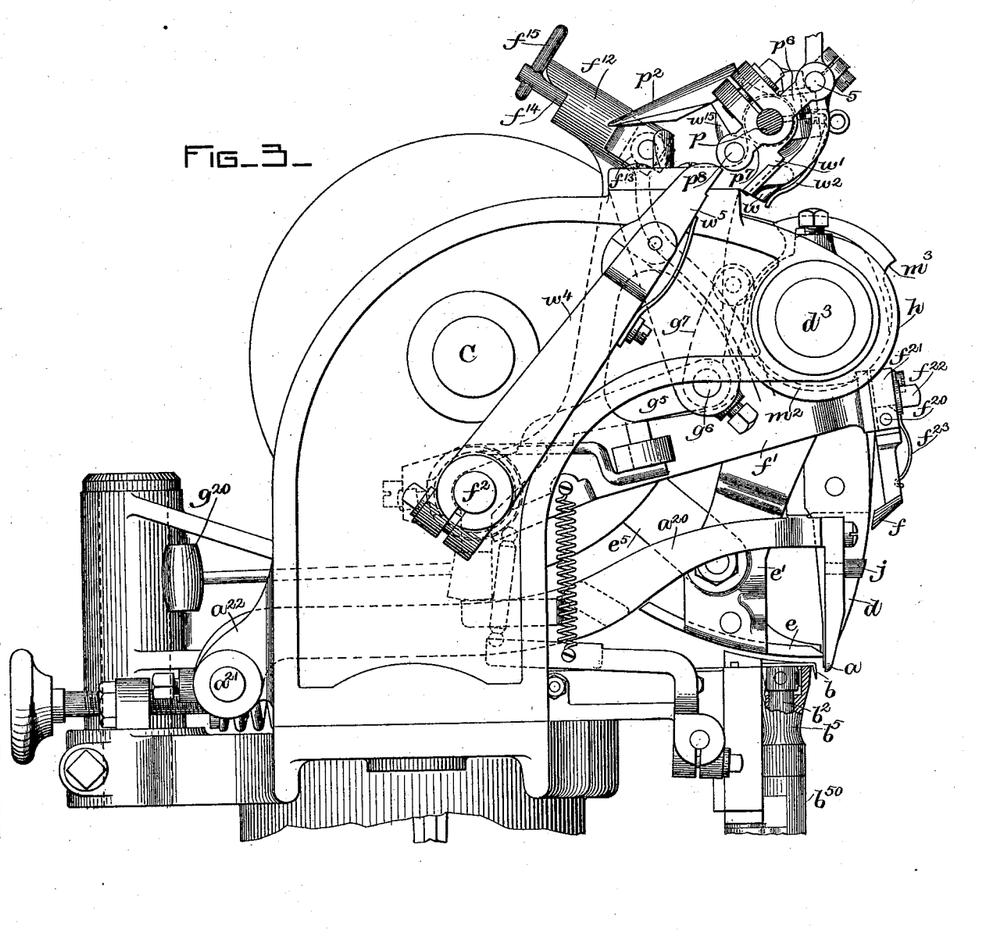
Fig. 3 is a left-hand side elevation of the machine shown in Fig. 1.
Figures 4, 7:
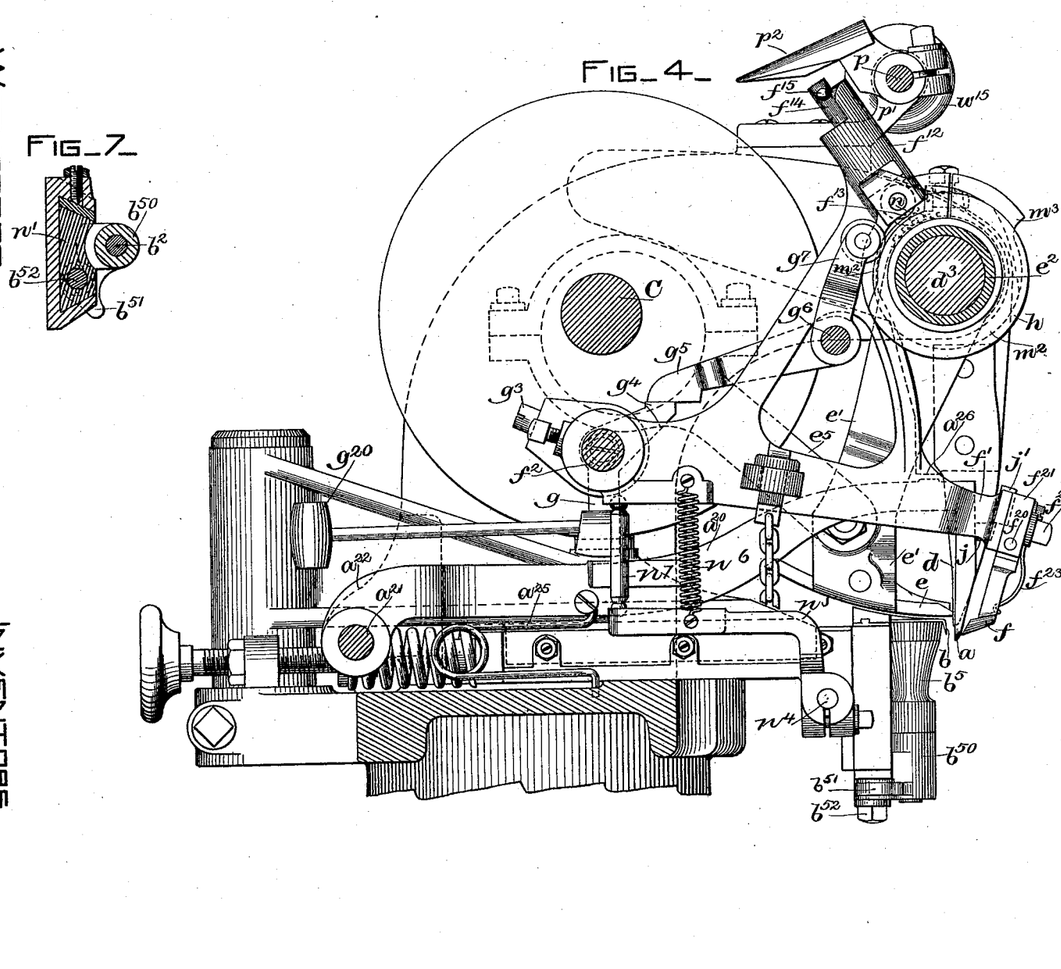
Fig. 4, a similar side elevation of the machine shown in Fig. 1, the left-hand side plate being removed to more clearly show the parts, which are represented in the position that they will occupy when operating around the fore part.
Fig. 7, a section of the channel-knife holder.
Figures 5, 6:
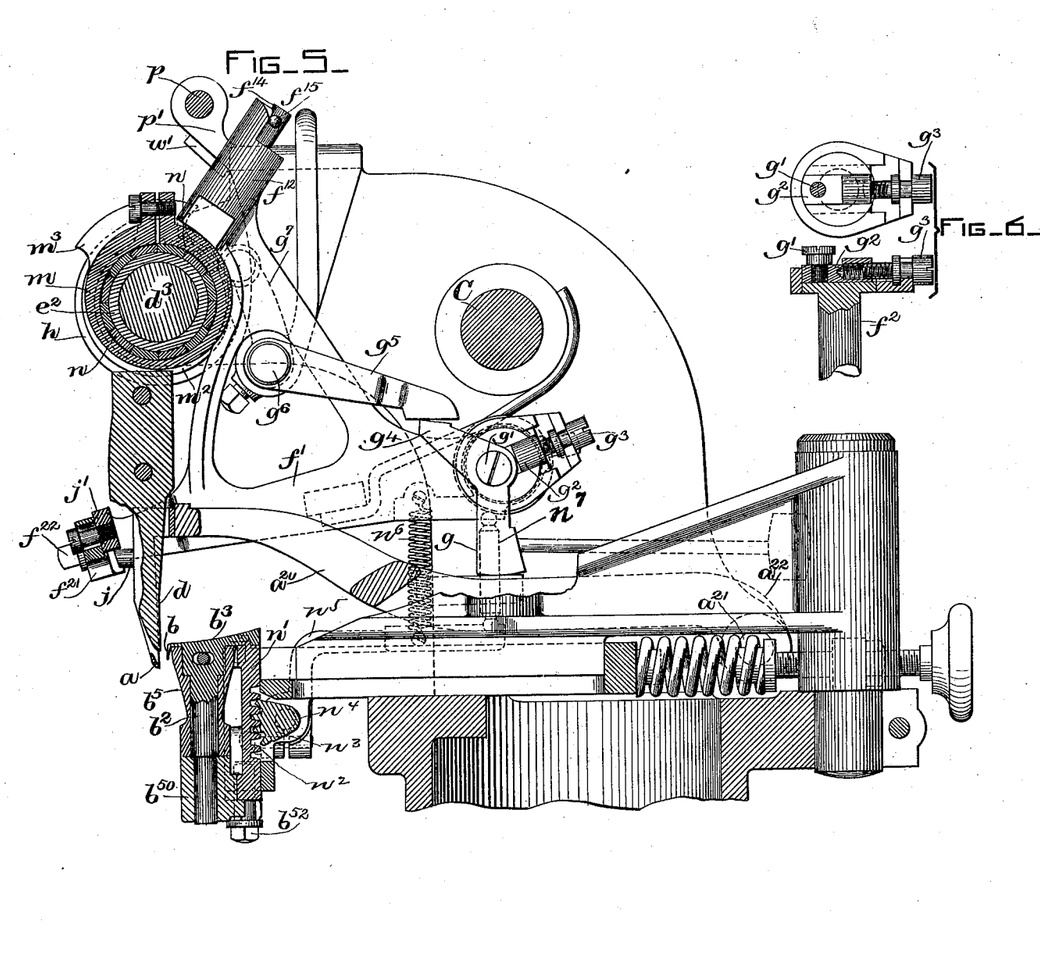
Fig. 5, a central vertical section of the machine, showing particularly the means for operating the two guides.
Fig. 6, details of the adjustable pivot or bearing for the actuating-arm which is employed to move the continuously-acting guide or support to move the work.

The work is fed along by the feeding-plate $d$ and vibrating sole-support $b^5$, which together act as a clamp-feeding device, and when said feeding-plate $d$ returns for a new grip on the work the movable guide or work-support will serve as the support for the welt side of the sole or face side of the welt, it coöperating with the sole-support $b^5$ in holding the work during such time. Thus the movable guide or work-support $a$ not only acts as a guide, but also as a device for assisting in holding the work while the feeding-plate returns for a new grip. Another guide or guiding device $f$ is attached in a more or less yielding and adjustable manner to an arm $f'$—as, for instance, it may be pivotally connected at $f^{20}$ to a block $f^{21}$, adjustably secured to said arm by a screw $f^{22}$, passing through a slot in said block, it being held pressed in a right-angular position to the arm by means of a spring $f^{23}$. This guide $f$ is adapted to be normally held in elevated position out of engagement with the lasted boot or shoe, as shown in Figs. 1 and 3, and to be brought into engagement with said boot or shoe around the fore part only, as shown in Figs 4 and 5. The guide-arm $f'$ is pivoted at $f^2$ and has attached to it a chain which is connected to a treadle, so that by depression of the treadle the guide may be brought into operative position, and whenever it is thus brought into operative position said guide $f$ will act in conjunction with the guide or support $a$ or to the exclusion thereof, depending upon its relative position thereto.

The fore-part guide $f$ is provided with suitable means whereby its movements are automatically controlled, and herein substantially the same automatic mechanism is shown as appears in application Serial No. 538,614, above referred to, to which reference may be had. As the particular construction of this automatic mechanism forms no part of our present invention, it is not herein illustrated in detail, but sufficiently to enable our present invention to be understood, and in general it may be described as follows: The guide-arm $f'$ has an upward extension $f^{12}$, bearing a cam-roll $f^{13}$, and has also at its upper end a latch $f^{14}$, movable in suitable bearings provided for it in a radial direction toward the shaft $d^3$. This latch is herein shown as a pin having a beveled lower end and a cross-piece or pin $f^{15}$ at its upper end, and inside the bearing containing said pin $f^{14}$ a spring (not shown) is placed which encircles the pin and is connected with it in such a manner as to depress it. The upper end of the extension $f^{12}$ is shouldered or cut away, presenting an upper and a lower rest for the cross-piece $f^{15}$. When the latch or pin $f^{14}$ is depressed, the cross-piece $f^{15}$ enters said cut-away portion and bears upon the lower rest; but when raised or withdrawn and given a quarter-turn the cross-piece $f^{15}$ will bear upon the upper rest, thereby holding the pin $f^{14}$ in its elevated position. The latch $f^{14}$ is made reversible in its bearings, so that its beveled end may be turned in one or the other direction, according as it may be necessary.

The rotary reciprocating or oscillating knife-carrying hub or sleeve $e^3$ is extended along the shaft $d^3$ and has upon its sleeve-like extension a notched collar or rim $n$, provided with sleeve-like extensions upon both sides, upon one of which a clamping-ring $m$ is placed which acts to frictionally bind the notched collar $n$ to the rotary reciprocating sleeve. A clamping-ring $m'$ embraces the opposite sleeve-like extension and has formed upon it two cams $m^2$ and $h$. The notched part $n$ of the collar is located beneath the latch or pin $f^{14}$ and the cam $m^2$ beneath the cam-roll $f^{13}$. The arm $f'$, carrying the guide $f$, is normally held in its elevated position, as shown in Fig. 3, and when it is moved into position to be used as the fort part or last guide the cam-roll $f^{13}$ will be brought to bear upon the cam $m^2$, as shown in Fig. 4. While the latch $f^{14}$ remains in its elevated position in its bearing, the notched collar $n$ is not engaged and the cam-roll $f^{13}$ will at such time rest idly upon the cam $m^2$ and the relative position of the guide $f$ and trimming and channeling knives will remain the same; but as soon as the latch is turned in one or the other direction it descends and its lower beveled end enters the notches cut in the part $n$, and as the sleeve bearing said part $n$ oscillates the cam is intermittingly rotated until the stop $m^3$ is brought to bear against the cam-roll. During the travel or progress of the cam $m^2$ the guide $f$ is gradually moved relatively to the trimming and channeling knives.

When the latch $f^{14}$ is in one position and the cam $m^2$ turned in one direction, the guide $f$ will be automatically raised, and when the position of the latch $f^{14}$ is reversed and the cam $m^2$ turned in the opposite direction the guide $f$ will be automatically lowered. These two movements are required for working upon left and right shoes.

Means are provided for automatically controlling the reversal of the latch $f^{14}$, which consists of a rod $p$, arranged horizontally in bearings $p'$, secured to the framework, having affixed to it a finger $p^2$, the upper side or face of which is beveled in opposite ways, and this finger projects toward the latch, but is located beneath the cross piece or pin $f^{15}$ when the latch is in its elevated position in its bearing and is arranged to be engaged by said pin $f^{15}$, as will be described. The rod $p$ is movable longitudinally in its bearings in order that the finger $p^2$ may occupy a position with one or the other beveled face directly beneath the pin $f^{15}$ on the latch $f^{14}$, and said rod is also free to be turned or rocked that the finger $p^2$ may be lifted to permit the return of the pin. A detent $w$ is pivoted to a stud 5, projecting from a part $p^6$ on the rod $p$, but connected and movable longitudinally with said rod, said detent engaging a stop $w'$ on the frame when the rod is in its extreme left-hand position, a spring $w^2$ being connected to said detent to draw it in. A spring $w^3$ encircles the rod $p$ and is connected at one end to the frame and at the other end to the finger $p^2$, or it may be the rod, the action of which is to move the rod $p$ and its attached finger $p^2$ toward the right whenever the detent $w$ disengages the plate $w'$. An arm $w^4$ is secured to the shaft of the guide-arm $f'$, which has a spring-pressed latch $w^5$ at its upper end, which as the guide-arm is depressed strikes and disengages the detent $w$ to thereby allow the rod $p$ to move toward the right. The rod $p$ and its attached parts are afterward moved toward the left or restored to their normal position by the operator pressing upon the knob $w^{15}$.

Assuming the parts are in the position shown in Fig. 1 and the operator desired to vary the width of the sole, he depresses the arm $f'$ by means of a treadle connected thereto, and in doing so the pin $f^{15}$ strikes the right beveled face of the finger $p^2$ and, moving along said face, is lifted and also turned substantially a quarter of a revolution, and the latch $w^5$ then strikes the detent $w$, disengaging it from the plate $w'$, and the spring-pressed rod $p$, thus released, is moved toward the right, carrying with it the finger $p^2$, which is fixed to it, and the latter during its passage strikes the pin $f^{15}$ and turns it farther to the right, so that it will fall into the cut-away portion of the extension $f^{12}$, and the latch $f^{14}$ is thus permitted to descend and engage the notched collar. The guide-actuating cam is then intermittingly turned. It will be seen that the latch $f^{14}$ is thus automatically turned one way by the act of depressing the guide-arm. The guide-arm is then elevated upon releasing the treadle.

When operating on the next shoe of the pair, the guide-arm is again depressed at the desired time and the pin $f^{15}$ turned a quarter of a revolution by striking and moving along upon the left beveled face of the finger $p^2$, and then the rod $p$ is pushed toward the left by the operator striking upon the knob $w^{15}$, and during such movement the finger $p^2$, bearing against the pin, moves it sufficiently for the latch $f^{14}$ to again drop into engagement with the notched collar, and the detent $w$ will at such time be moved into engagement with the cut-away plate $w'$. Thus it will be seen that the latch $f^{14}$ is reversed each time it is depressed or caused to engage the notched collar.

The rod $p$ is capable of being turned in its bearings and has secured to and projecting from it two short arms $p^6$ $p^7$, the arm $p^6$ bearing the pin 5 and the arm $p^7$ bearing a pin $p^8$, and when the rod $p$ is in proper position for the finger $p^2$ to coöperate with the latch $f^{14}$ the pin $p^8$ bears against the support $p'$;

but whenever desired the rod $p$ may be oscillated, the finger $p^3$ moved out of coöperative relation with the latch $f^{14}$, and at such time the pin 5 will bear against the support $p'$.

The guide or support $a$ is adapted to be moved by the guide-arm, or it may be the guide $f$, and for the accomplishment of this purpose the guide $a$ is herein shown as having projecting from it a pin $j$, which lies in the path of movement of a block $j'$ on the guide $f$, and when the guide $f$ is depressed said block $j'$ will strike said pin $j$ and move said guide $a$, so that during the time the block $j'$ is in engagement with the pin $j$ the two guides may be moved together, and said guide or support $a$ has another actuator, to be described, which is herein shown as operated by or in conjunction with the guide-arm $f'$. As the guide-arms $a^{20}$ and $f'$ are pivoted on different centers and the arm $f'$ of shortest radius, it will be seen that the guide $f$ may be caused to advance slightly beyond the guide or work-support $a$ when depressed, and in such case the guide $a$ will become solely a support, the work being guided by the guide $f$.

In trimming Scotch-edged soles—i. e., wherein the projecting edge all around the fore part is of substantially the same width, yet wider than the projecting edge along the shank portion—the means above described—viz., the pin $j$ and block $j'$ on the guide $f$—is all that is necessary as a means for operating the guide or support $a$, and in such case the operation of these parts will be as follows: The lasted shoe is held up against the guide or support $a$ and the sole is trimmed along the shank portion, and then the fore-part guide $f$ is depressed, and just as or about the time that it is brought to bear upon or against the form or last its block $j'$ will engage the pin $j$ and the two guides will be moved together, thereby bodily moving the shoe transversely to the travel of the work and away from the knives. This movement is limited according to the distance that it is desired the sole shall project. As soon as the sole around the fore part is trimmed the fore-part guide $f$ will be elevated and the guide or support $a$ permitted to resume its normal elevated position and the work can be moved accordingly, and then the sole is trimmed along the other shank portion. The latch $f^{14}$ is not thrown into engagement with the notched wheel $n$ when trimming and channeling Scotch-edged soles, but its cross-piece $f^{15}$ rests upon the upper rest of the extension $f^{12}$, and in such case when the fore-part guide $f$ is depressed the roll will rest idly upon the cam $m^2$. By moving the guide or support $a$, with the guide $f$, around the fore part it will be seen that its lower end may continue to occupy the same position in the crease as it did along the shank portion, or if not it will deeply enter the crease, and as a consequence no ridge or line of depression is formed on the face of the welt, as in cases where said guide is stationarily supported, and the work is moved in and out with relation thereto and to the knives.

The guide $f$, it will be seen, is made adjustable on its arm or support, so that its relative position to the guide or support $a$ may be determined, and this enables us to so position the guides with relation to each other that the fore-part guide $f$ may move the guide or support $a$ to such an extent that while it may continuously enter the crease it will not bottom therein, and the result in such case is that the guide $f$ is actually and exclusively the guide for the shoe around the fore part, while the part $a$ serves only as a support. Such means of guiding the shoe we deem preferable to guiding it by means of a guiding device which bottoms in the crease, for in the latter case the guiding device follows the irregularities of the inseam and the edge of the sole is trimmed accordingly, and, furthermore, if said guiding device is made so as to properly enter the crease at the shank and guide the shoe it does not well subserve the purpose as a guide around the fore part, as it is liable to wedge in the crease and strain the seam.

Figure 9:
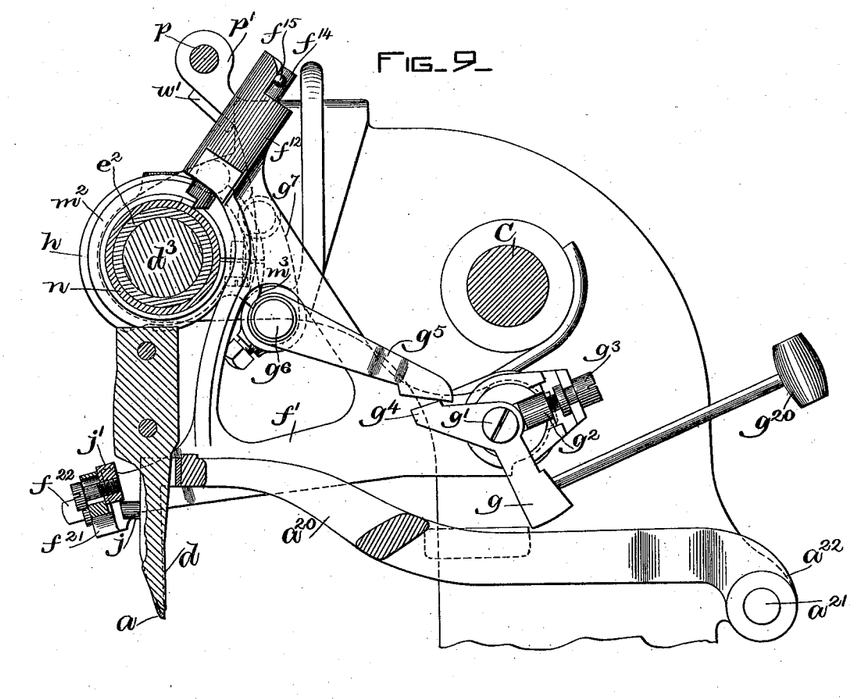
Fig. 9, a vertical section similar to Fig. 5, showing the actuating-arm for the continuously-acting guide or support.

For trimming Baltimore-edged soles—i. e., wherein the edge of the sole around the fore part varies in width, being widest along the outside ball portion—the treadle and the automatic mechanism for moving the fore-part guide $f$ and guide or work-support $a$, as above described, are employed, and in addition thereto independent means are provided for moving said guide or work-support $a$, so that the edge of the sole may be gradually widened between the shank and the widest part of the outside ball portion when working on a left shoe and the reverse when working on a right shoe. The independent means or mechanism herein shown for accomplishing this result consists of an actuating lever or arm $g$, loosely mounted upon a pivot-screw $g'$, fixed to a block $g^2$, supported upon the end of the shaft $f^2$, and adjustable diametrically in a bearing formed at the end of said shaft by means of an adjusting-screw $g^3$. (See Fig. 6.) The pivot-screw $g'$ is adjustable from a position in line with the axis of the shaft $f^2$, as shown in Fig. 3, to a position remote from or eccentric to said axis, as shown in Figs. 5 and 9. The actuating-arm $g$ is made long enough to reach the guide-arm $a^{20}$ when the pivot $g'$ is in line with the axis and to move said guide-arm when adjusted eccentric thereto, the extent of such movement being in accordance with the eccentricity of the pivot, and said actuating-arm $g$ has an upward extension $g^4$ projecting from the pivot-screw $g'$ more or less at right angles to the arm $g$, which is adapted to be engaged by one arm $g^5$ of a bell-crank lever pivoted at $g^6$ to a bracket on the frame, the other arm $g^7$ of said bell-crank lever having a friction-roll which bears upon a cam $h$, herein shown as made fast to or integral with the cam $m^2$. As the fore-part guide-arm $f'$ is depressed its shaft $f^2$ being turned will cause the actuating-arm $g$, if its pivot is adjusted eccentrically, to descend and, by pressing upon the guide-arm $a^{20}$, will gradually depress the guide $a$ until such time as the roll $f^{13}$ on the guide-arm $f'$ strikes the cam $m^2$, and the block $j'$ will then engage the pin $j$. The latch $f^{14}$ is then turned and depressed, and the cam $h$ will then be intermittingly rotated with the cam $m^2$, and the bell-crank lever $g^7$ $g^5$ will be turned on its pivot by said said cam $h$, turning the actuating-arm $g$ on its pivot from the position shown in Fig. 5 to the position shown in Fig. 9, thus throwing it out of engagement with said guide-arm $a^{20}$. Attached to the actuating-arm $g$ is a weight $g^{20}$, which holds it with its extension $g^4$ pressed into engagement with the arm $g^5$, and hence serves as the means of keeping the arm $g^7$ in engagement with the cam $h$. As the actuating-arm $g$ is thus swung on its pivot, raising its attached weight $g^{20}$, its lower engaging end soon passes by or out of engagement with the guide-arm $a^{20}$, at which time said guide-arm $a^{20}$ will be held down by the block $j'$ engaging the pin $j$. The guide-arm $a^{20}$ will then be restored to its normal elevated position as the fore-part guide $f$ is raised or restored to its normal position.

In Fig. 8 a diagram is shown of a "left" shoe, and in trimming such sole the parts will operate in the manner just described—that is to say, the guide $a$ will be held in its normal elevated position while acting along the shank portion—say from the point 51 to the point 52. Then the fore-part guide $f$ will be gradually depressed, and as it descends the guide-arm $a^{20}$ will be gradually depressed by the actuating-arm $g$ as the work moves along from the point 52 to the point 53, at which time the fore-part guide $f$ will have been brought into engagement with the last or form, and the block $j'$ carried thereby will at such time be first brought into engagement with the pin $j$. The actuating-arm $g$ is then thrown out, and the guide $a$ will be held solely by the guide $f$, after which the two guides $a$ and $f$ will gradually rise together as the work progresses from the point 53 toward the toe and until the cam $m^2$ ceases to move the fore-part guide-arm $f$, and then the fore-part guide $f$ may be removed from its engagement with the lasted shoe by releasing the treadle. A left shoe having thus been completed, it will be seen that the cam $m^2$ will be left at the end of its throw or oscillation with the highest part directly beneath the roll $f^{13}$, and the actuating-arm $g$ will be thrown out and the parts when in such position are ready to act upon a "right" shoe.

In beginning the right shoe the guides $a$ and $f$ will be in their elevated positions, as when beginning a left shoe; but the actuating-arm $g$ will be thrown out, as represented in Fig. 9, and the work will be begun on the long shank side. The guide $a$ will first work to the exclusion of the guide $f$ along the long shank portion, and then the guide-arm $f'$ will be depressed by the treadle until its roll $f^{13}$ is brought into engagement with the cam $m^2$ at the highest part thereof, at which time the block $j'$ on the guide $f$ will be brought into engagement with the pin $j$ on the guide $a$, and then as soon as it is desired to widen the projecting edge of the welt or sole—as, for instance, just after turning the toe—the cam $m^2$ will be started or caused to rotate and to gradually return to its former position, (shown in Fig. 3,) and the guide-arm $f'$ will during the time that the cam is thus acting gradually descend, and its block $j'$, being in engagement with the pin $j$, will gradually depress the guide $a$ conjunctively with said guide $f$ until the cam $m^2$ ceases to rotate, at which point the bell-crank lever $g^7$ $g^5$, bearing on the cam $h$, falls into the open place or space in the said cam $h$, thereby allowing the actuating-arm $g$ to return to the position shown in Fig. 5 and to hold the arm $a^{20}$ down and thereafter allow it to rise gradually upon the ascent of the guide-arm $f'$. This gradual conjunctive action of the guides caused by the actuating-arm $g$ takes place in passing from the widest part of the ball to the shank just reversely to that described in a left shoe.

The extent of movement of the guide $a$ which may be produced by the guide-arm $f'$ may be determined by adjustment of the actuating-arm $g$ toward and from the axis of the shaft $f^2$, and when the pivot-screw $g'$ of said actuating-arm is coincident with the axis of said shaft $f^2$ depression of the fore-part guide $f$ will merely turn the pivot-screw on its own axis and the actuating-arm $g$ will not engage and move the arm $a^{20}$, so that for some classes of work this pivot-screw may be adjusted or set coincident with the axis of the shaft $f^2$.

We do not desire to limit our invention to any particular construction of mechanism for operating the guide $a$ thus independently of the other means herein shown for operating it, as it is obvious that many different ways may be devised for accomplishing this result.

The channel-knife $b$ is formed on or projects from a plate $b^3$, which is secured to a rising-and-falling block $n'$, having formed on it rack-teeth $n^2$, and said plate has a post $b^2$, which has placed upon it a friction-roll $b^5$, of any suitable shape, and as it is desirable that this friction-roll shall be easily removable we have placed upon the post $b^2$, beneath said roll, a collar $b^{50}$, having an ear $b^{51}$ projecting laterally from it, which is bifurcated to receive the shank of a screw $b^{52}$, which projects from the lower end of the rising-and-falling block or rack $n'$. By loosening said screw the collar $b^{50}$ may be turned and removed, and the friction-roll may then be easily removed. The rack-teeth $n^2$ of the block are engaged by a toothed sector $n^3$, secured to a short shaft $n^4$, having its bearings in a block provided for it, and to said short shaft a crank-arm $n^5$ is secured, which extends rearwardly and which is connected to the pivoted arm $f'$ by a spring $n^6$ and also by a pin $n^7$, the latter being connected at both ends by ball-and-socket joints or other loose connections. It will be observed that whenever the arm $f'$ is depressed the crank-arm $n^5$ will be correspondingly moved, thereby rocking the shaft $n^4$ and raising the channel-knife holder.

The machine thus shown and described may be used as a universal rounding or rounding and channeling machine—that is to say, it may be operated to trim a plain edge or an extension edge of either the Scotch or Baltimore variety herein referred to. Two guides $a$ and $f$ are shown, but in many instances we may use only one guide, either with or without all of its operating devices.

The machine herein shown contains trimming and channeling knives and feeding mechanism for the work and a guiding device for the work movable freely toward and from the trimming and channeling knives during the trimming and channeling operation to vary the position of the boot or shoe with relation to said knives and thereby vary the width of the projecting edge of the sole; but such feature is not herein claimed, for the reason that it forms the subject-matter of our application, Serial No. 572,258, and the machine herein shown further contains features which are claimed in our application, Serial No. 530,849, hereinbefore referred to, to wit: the feeding mechanism for the work; feeding mechanism for the work having as a coöperative part of it a feeding-jaw which recurrently closes upon the welt on the welt side of the sole, serving as a clamp-feeding and welt-compressing device; the means for vertically moving the channel-knife; the channel-knife and a guide movable toward and from each other and adjusting devices for said channel-knife for adjusting it toward and from the guide; the trimming-knife and channel-knife and a guide freely movable with relation to the trimming-knife during the trimming operation and adjusting devices for the channel-knife connected with the means for moving said guide; a cutting-block which forms a coöperative part of the feeding mechanism and against which a vibrating trimming-knife acts; a trimming-knife and guide, one of which parts is movable with relation to the other during the trimming operation to vary the width of the projecting edge of the sole, and a channel-knife and means for moving it toward and from the trimming-knife during the trimming operation.

We claim—

1. In a machine for operating upon the soles of boots and shoes, a movable guide or support, acting along both the shank and fore part, and a movable guiding device acting along the fore part only, substantially as described.

2. In a machine for operating upon the soles of boots and shoes, a movable guide or support for the work, and a movable guiding device acting independently of or conjunctively with the aforesaid movable guide, substantially as described.

3. In a machine for operating upon the soles of boots and shoes, a movable guide or support acting along both the shank and fore part, and a movable guiding device, normally held out of engagement with the boot or shoe, and means for moving it into engagement with said boot or shoe, substantially as described.

4. In a machine for operating upon the soles of boots and shoes, a movable guide or support acting along both the shank and fore part, means for moving it to vary the position of the boot or shoe in passing from the shank to the fore part, or the reverse, and a movable guiding device for the fore part acting independently of or conjunctively with the aforesaid guide or support, substantially as described.

5. In a machine for operating upon the soles of boots and shoes, a movable guide or support acting along both the shank and fore part, and a movable guiding device acting along the fore part only, in conjunction with and outside of the aforesaid guide, and means for moving said guiding device, substantially as described.

6. In a machine for operating upon the soles of lasted boots and shoes, a movable guide or support operating along both the shank and fore part, shaped and adapted to enter the crease, and a movable guiding device operating along the fore part only, shaped and adapted to bear against the last, substantially as described.

7. In a machine for operating upon the soles of lasted boots and shoes, two movable guides or supports, one operating along both the shank portion and fore part, and the other operating around the fore part only, a treadle connected with one of said guides and means for operating the other guide controlled also by said treadle, substantially as described.

8. In a machine for operating upon the soles of boots and shoes, a movable guide or support acting along both the shank and fore part, means for moving it to vary the position of the boot or shoe in passing from the shank to the fore part, or the reverse, and a guide for the fore part carried by the means employed for moving the aforesaid guide or support, substantially as described.

9. In a machine for operating upon the soles of boots and shoes, a pivoted guide or support acting along both the shank and fore parts, and a pivoted guiding device for the fore part, said guide or support and said guiding device turning on different centers, a connection between said guide or support and said guiding device, whereby the former is operated by the latter, and a treadle connected with the said guiding device for operating it, substantially as described.

10. In a machine for operating upon the soles of lasted boots and shoes, two movable guides or supports, one operating continuously along the shank portion and fore part, and the other operating along the fore part only, a connection between said guides or supports whereby one operates the other, and a treadle connected with the operating guide or support, substantially as described.

11. In a machine for operating upon the soles of boots and shoes, two movable guides or supports, one operating along both the shank portion and fore part, and the other operating around the fore part only, a pin projecting from one of said guides or supports which lies in the path of movement of a projection on the other guide or support, whereby one operates the other, and a treadle connected with the operating guide or support, substantially as described.

12. In a machine for operating upon the soles of boots and shoes, a movable guide or support, and an operating device therefor made adjustable to vary the extent of movement produced by it, and a guide or support actuated by said operating device, substantially as described.

13. In a machine for operating upon the soles of boots and shoes, two movable guides or supports, one operating along both the shank portion and fore part, and the other operating around the fore part only, and automatic means for automatically operating both of said guides or supports, substantially as described.

14. In a machine for operating upon the soles of boots and shoes, a guide or work-support adapted to act all around that portion of the boot or shoe that is being operated upon, and an independent fore-part guide normally held out of engagement with the boot or shoe, and means for bringing it into engagement with the boot or shoe, and means for moving both said guide or work-support, and said fore-part guide while they are both engaging and acting around the fore part, substantially as described.

15. In a machine for operating upon the soles of boots or shoes, a guide or work-support adapted to act all around that portion of the boot or shoe that is being operated upon, and an independent fore-part guide normally held out of engagement with the boot or shoe, and automatic means for moving both said guide or work-support and said fore-part guide while they are engaging and acting around the fore part, substantially as described.

16. The combination with one or more knives adapted to act upon the soles of lasted boots and shoes, of a movable guide or support operating along both the shank portion and fore part, and a movable guiding device adapted to operate around the fore part only, to vary the position of the boot or shoe with relation to said knives while they are in operation, substantially as described.

17. The combination with one or more knives adapted to act upon the soles of lasted boots and shoes, of a movable guide or support acting along both the shank portion and fore part, and automatic means for automatically operating said guide or support to vary the position of the boot or shoe with relation to said knives while they are in active operation, substantially as described.

18. In a machine for operating upon the soles of lasted boots and shoes, the combination of a continuously-acting welt or work support at the welt side of the sole movable transversely to the progress of the work, a four-motioned plate also acting upon the welt side of the sole, a vibrating sole-support acting against the bottom of the sole and coöperating with the four-motioned plate to feed along the shoe while held against said movable work-support, substantially as described.

19. In a machine for operating upon the soles of boots and shoes, a spring-pressed vibrating sole-support, a movable work-support or guide acting along both the shank portion and fore part, and an intermittingly-acting feeding-plate, substantially as described.

20. In a machine for operating upon the soles of boots and shoes, a channel-knife, and a guide or support for the work acting along both the shank and fore part, and means for moving said guide or work-support and said channeling-knife toward and from each other, substantially as described.

21. In a machine for operating upon the soles of boots and shoes, a channel-knife, a pivoted guide or work-support adapted to act along both the shank and fore part, the pivoted arm $f'$ and means for moving it, a connection between said arm and said channel-knife whereby the latter is moved by the former and a connection between said arm and said guide or support, whereby the latter is also moved by the former, substantially as described.

22. In a channeling-machine, a channel-knife and a fore-part guide, movable toward and from each other, and adjusting devices for adjusting said channel-knife toward and from said guide, connected with the means employed for moving said guide toward and from the channel-knife, and another guide or support for the work acting along both the shank and fore part, also movable with relation to said channel-knife, substantially as described.

23. In a channeling-machine, a channel-knife and a fore-part guide movable toward and from each other, an operating device for said guide for moving it toward and from the channel-knife and adjusting devices for adjusting said channel-knife toward and from the guide, connected with and operated by the means employed for moving said guide, and another guide or support for the work acting along both the shank and fore part, also movable with relation to said channel-knife and operated by the means employed for moving said fore-part guide, substantially as described.

24. In a trimming and channeling machine, a trimming-knife, a fore-part guide freely movable with relation to the trimming-knife during the trimming operation, a channel-knife, and adjusting devices therefor connected with the means employed for moving said fore-part guide, and another guide or support for the work acting along both the shank and fore part, also movable with relation to said knives, and operated by the means employed for moving the fore-part guide, substantially as described.

25. In a machine for operating upon the soles of boots and shoes, the combination of a continuously-acting movable guide or welt-support against which the work is pressed bearing upon the welt side of the sole, a movable sole-support carrying a channeling-knife, a plate at the welt side of the sole acting in conjunction with said sole-support to feed along the work, which also serves as a cutting-block, and a vibrating trimming-knife acting against said cutting-block, and a limiting-stop for said movable guide, substantially as described.

26. In a machine for operating upon the soles of lasted boots and shoes, a guide or work-support acting along both the shank and fore part, means for lowering it quickly when acting upon one shoe of a pair, to vary the position of said shoe with relation to the operating-tools and means for thereafter gradually raising it, substantially as described.

27. In a machine for operating upon the soles of lasted boots and shoes, a guide or work-support acting along both the shank and fore part, means for lowering it slowly when acting upon one shoe of a pair, to vary the position of said shoe with relation to the operating-tools, and means for thereafter quickly raising it, substantially as described.

28. In a machine for operating upon the soles of lasted boots and shoes, a guide or work-support acting along both the shank and fore part, two independent devices for operating it to vary the position of the shoe with relation to the operating-tools, one causing or permitting a slow movement of said guide or work-support, and the other causing or permitting a quick movement thereof, substantially as described.

29. In a machine for operating upon the soles of lasted boots and shoes, a guide or work-support acting along both the shank and fore part, treadle-controlled mechanism for operating it, and automatic means for automatically operating it, said operating devices working independently, first one and then the other on the respective shoes of a pair.

30. In a machine for operating upon the soles of lasted boots and shoes, a work-support acting along the shank and fore part, means for lowering it, a fore-part guide, means for lowering it, and automatic mechanism for raising said work-support and fore-part guide conjunctively, substantially as described.

31. The channel-knife $b$ projecting from a plate having a post $b^2$, friction-roll $b^5$ removably placed on said post $b^2$, a collar $b^{50}$ removably placed on said post, and a locking device, substantially as described therefor.

32. In a machine for operating upon the soles of lasted boots and shoes, a movable guide or work-support acting along both the shank and fore part, pivoted arm $f'$, an actuating-arm $g$ operated by it for moving said guide or work-support, substantially as described.

33. In a machine for operating upon the soles of lasted boots and shoes, the combination of a pivoted spring-controlled arm $a^{20}$, guide attached thereto and pin $j$, the pivoted arm $f'$ and block $j'$ carried by it adapted to engage said pin $j$ and thereby move said arm $a^{20}$, substantially as described.

In testimony whereof we have signed our names to this specification in the presence of two subscribing witnesses.

ZACHARY T. FRENCH.
WILLIAM C. MEYER.

Witnesses:
B. J. NOYES,
F. H. DAVIS.